United States Patent
Roychoudhury et al.

(10) Patent No.: US 8,439,990 B2
(45) Date of Patent: May 14, 2013

(54) REACTOR FLOW CONTROL APPARATUS

(75) Inventors: Subir Roychoudhury, Madison, CT (US); David Spence, Beacon Falls, CT (US); Richard Mastanduno, Milford, CT (US); Dennis E. Walsh, Richboro, PA (US); Jun Iwamoto, Saitama (JP); Go Motohashi, Saitama (JP); Hitoshi Mikami, Saitama (JP); Eric Walker, Dublin, OH (US)

(73) Assignees: Precision Combustion, Inc., North Haven, CT (US); Honda Motor Co., Ltd., Tokyo (JP)

( * ) Notice: Subject to any disclaimer, the term of this patent is extended or adjusted under 35 U.S.C. 154(b) by 398 days.

(21) Appl. No.: 12/460,543

(22) Filed: Jul. 21, 2009

(65) Prior Publication Data

US 2011/0016791 A1 Jan. 27, 2011

(51) Int. Cl.
*B01J 7/00* (2006.01)
*C01B 3/36* (2006.01)
*C01B 6/24* (2006.01)

(52) U.S. Cl.
USPC .............. 48/61; 48/197 R; 423/644

(58) Field of Classification Search ........ 48/61; 239/298
See application file for complete search history.

(56) References Cited

U.S. PATENT DOCUMENTS

| | | | |
|---|---|---|---|
| 4,121,542 A | 10/1978 | Frie et al. | |
| 6,783,742 B2 | 8/2004 | Bentley | |
| 6,869,456 B2 | 3/2005 | Salemi | |
| 6,887,436 B1 | 5/2005 | Fisher | |
| 7,156,886 B2 | 1/2007 | Nakamura | |
| 2003/0000145 A1 | 1/2003 | Salemi et al. | |
| 2003/0132315 A1* | 7/2003 | Nau et al. | 239/398 |
| 2004/0182078 A1* | 9/2004 | Tsokonas | 60/605.1 |
| 2005/0028445 A1 | 2/2005 | Roychoudhury | |
| 2006/0179717 A1 | 8/2006 | LaBarge | |
| 2007/0036707 A1 | 2/2007 | Dalla Betta et al. | |
| 2007/0084118 A1 | 4/2007 | Kaeding | |
| 2007/0151154 A1 | 7/2007 | Lyubovsky | |
| 2007/0158451 A1* | 7/2007 | Mao et al. | 239/13 |
| 2008/0020336 A1 | 1/2008 | Kaeding | |
| 2008/0110419 A1 | 5/2008 | Sakurai et al. | |
| 2008/0121736 A1* | 5/2008 | Mao et al. | 239/102.2 |

(Continued)

FOREIGN PATENT DOCUMENTS

DE 199 30 051 A1 1/2001
DE 10 2004 049903 A1 4/2006

(Continued)

OTHER PUBLICATIONS

Davis (Non-Patent Literature, Final Report, Development of Technologies to Improve Cold Start Performance of Ethanol Vehicles, Jun. 11, 2001.).*

(Continued)

*Primary Examiner* — Matthew Merkling
(74) *Attorney, Agent, or Firm* — Robert L. Rispoli

(57) ABSTRACT

An apparatus for fuel reforming is provided that utilizes pulsed injectors for a fuel flow controller and an air flow controller, and the injectors are integrated with an atomizing mixer thereby producing a fuel-air mixture having an O/C Ratio which, in turn, is passed to a Catalytic Partial Oxidation reactor. Use of this apparatus permits beneficial long term operation of this Catalytic Partial Oxidation reactor.

14 Claims, 1 Drawing Sheet

U.S. PATENT DOCUMENTS

| | | | |
|---|---|---|---|
| 2009/0081492 A1 * | 3/2009 | Hasuka et al. | 429/13 |
| 2009/0228146 A1 | 9/2009 | Roychoudhury | |
| 2009/0252661 A1 | 10/2009 | Roychoudhury | |

FOREIGN PATENT DOCUMENTS

| | | |
|---|---|---|
| EP | 1 787 949 A2 | 5/2007 |
| EP | 2 123 599 A1 | 11/2009 |
| JP | 2007-40203 A | 2/2007 |
| JP | 2007-169150 A | 7/2007 |
| JP | 2008-63996 A | 3/2008 |
| WO | WO 2004060546 A3 | 7/2004 |

OTHER PUBLICATIONS

Krumpelt et al. (Non-Patent Literature, Diesel Reforming for Solid Oxide Fuel Cell Application, Jan. 2005).*

European Search Report, Sep. 28, 2010, for European Patent Application No. 10170002.9-2104, filed Jul. 19, 2010, corresponding to the instant application.

* cited by examiner

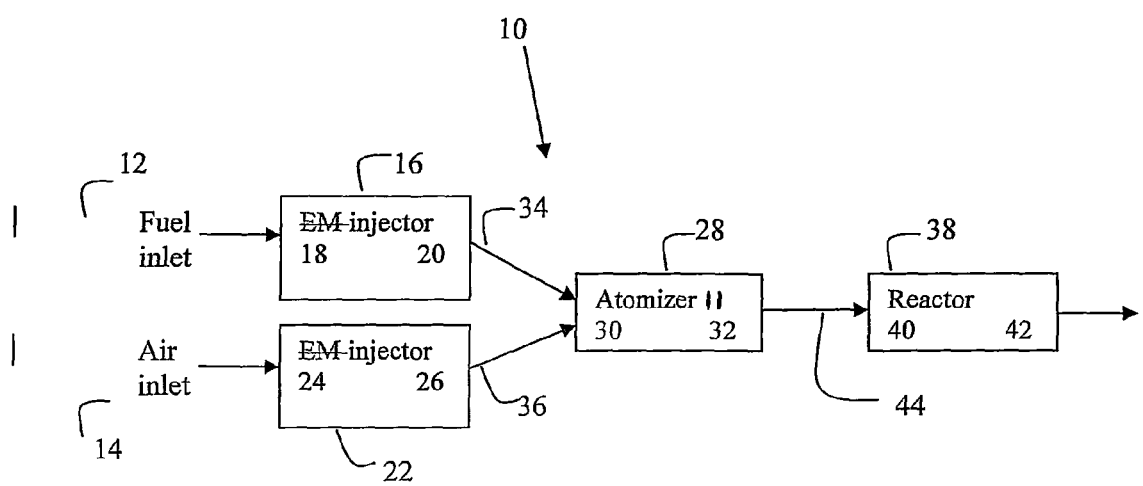

REACTOR FLOW CONTROL APPARATUS

FIELD OF THE INVENTION

Very fast reactor response times are desirable for many dynamic applications. This requires reactors that respond very quickly to system demands. The present invention relates to an apparatus for controlling reactant flows with short time constants without compromising fuel/air mixing during the transient points of operation. In particular, this invention provides a flow control apparatus that enables correspondingly fast control of reactant flow to the reactor without sacrificing fuel/air mixing. While this is applicable to different types of catalytic reforming reactors, it is described here with reference to a Catalytic Partial Oxidation Reactor since the constraints of high temperature and coking are most acute.

BACKGROUND OF THE INVENTION

Brief Description of the Related Art

There are many systems known in the art for controlling the reactant flows within a chemical reactor. Closed-loop systems are among these known methods. Typically, a controller is employed such that one or more output variables of a system are tracked against a certain reference points over time. The controller varies the inputs to a system to obtain the desired effect on the output of the system thereby maintaining the output variables at or near the reference points. Accordingly, a closed-loop system for controlling the reactant flows within a chemical reactor would monitor the reactant products or other operating parameters such as operating temperatures, track the measurements and compare such values to a desired reference. The system would provide for varying the reactor input and other operating parameters in order to maintain operation of the reactor at or near a reference point or reactor temperature setpoint.

Waterless catalytic partial oxidation (hereinafter referred to as "CPOx") of liquid distillate fuels, such as, for example, diesel and JP8, with near complete conversion to Carbon ($C_1$) products is a challenging proposition. The general reaction is shown below:

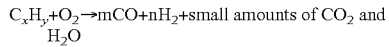

The practical ability to operate in this mode requires a reactor design that provides high selectivity to the partial oxidation products CO and $H_2$ compared to the complete oxidation products $CO_2$ and $H_2O$.

CPOx of distillate fuel is made difficult due to carbon formation and/or excessively high reactor temperatures. In the present invention, in conjunction with reactor design, unique control algorithms permit operational precision that addresses the constraints of dry CPOx.

It is an object of the present invention to provide a reactor apparatus that responds very quickly to system demands without compromising fuel/air mixing and flow control during the transient points of operation. It is another object of the present invention to provide an apparatus that permits the simultaneous varying of reactant flows with short time constants without compromising fuel/air mixing.

DESCRIPTION OF THE INVENTION

A reforming reactor was tested for the dry reforming of distillate fuels. It was based on a small, modular catalytic reactor, which employed patented Microlith® substrate and catalyst technology available from Precision Combustion, Inc. in North Haven, Conn. The use of standard flow controllers have been found to be too slow to react to the dynamic capabilities for Microlith® CPOx reactors and system needs. The use of high speed modulating valves is expensive and they are difficult to control. Moreover, low flows in small reactors may not produce high enough average velocity to provide sufficient atomization of liquid fuels.

Accurate control of the minimum required ratio of oxygen atoms to carbon atoms (known in the art as the "O/C Ratio)" is especially important in CPOx reactors as small offsets can result in large temperature excursions or coke deposition, resulting in reactor damage or performance compromises. With reference to FIG. 1, the present invention provides an apparatus (10) comprising integration of an atomizer design with pulsed injectors, for example, those including but not limited to electromagnetic injectors or piezoelectric injectors, for fuel and air control. Accordingly, as shown in FIG. 1, the apparatus (10) has an atomizer (11). The atomizer (11) is capable of providing sufficient atomization of fuels and appropriate fuel and air mixing over the desired range of fuel and air flows.

BRIEF DESCRIPTION OF THE DRAWINGS

FIG. 1 provides a diagram of a reactor flow control apparatus in accordance with the present invention.

DETAILED DESCRIPTION OF THE INVENTION

As shown in FIG. 1, a reactor flow control apparatus (10) in accordance with the present invention comprises a fuel inlet (12) and an air inlet (14). The apparatus (10) further comprises a fuel flow controller (16) defining an inlet (18) and an exit (20). The apparatus (10) correspondingly further comprises an air flow controller (22) defining an inlet (24) and an exit (26).

The fuel flow controller and air flow controller may comprise a variety of means known or hereinafter developed for regulating such flows. Such devices may comprise pulsed injectors, steady flow valves, and similar flow regulating means. All such flow regulating means are considered within the scope of the present invention.

Continuing with FIG. 1, apparatus (10) comprises an atomizing mixer (28), as represented by the atomizer (11), defining an inlet (30) and exit (32). Inlet (30) may comprise one or more apertures based upon the particular operating parameters of apparatus (10). In addition, means now known in the art or hereinafter developed for controlling an atomizer wherein the atomizing mixer (28) produces a fuel-air mixture are considered within the scope of this invention. Preferably, atomizing mixer (28) is adjusted to produce a fuel-rich mixture; however, it also may be adjusted to produce a fuel-lean mixture based upon the particular operating parameters of apparatus (10).

The exit (20) of fuel flow controller (16) is placed in fluid communication with inlet (30) of atomizing mixer (28) via a passageway (34). Similarly, the exit (26) of air flow controller (22) is placed in fluid communication with inlet (30) of atomizing mixer (28) via a passageway (36). Apparatus (10) includes a reforming reactor (38) defining an inlet (40) and an exit (42). Exit (32) of atomizing mixer (28) is placed in fluid communication with inlet (40) of reforming reactor (38) via a passageway (44).

The pulsed injectors are capable of providing precise fuel control over the range of fuel and air flows with response times capable of complementing the fast response of the catalytic reactor. In addition, various adjustments can be made to passageways (34) and (36) based upon the particular operating parameters of apparatus (10). These adjustments are defined as "tuning" the apparatus to achieve optimum performance.

Tuning the apparatus may include adjusting the volume of flow through the passageway in order to dampen the flow oscillations in conjunction with the frequency or amplitude of the pulses of the pulsed injector. The volume can be selected for damping the pulses without compromising response time. The possibility of variation in frequency, pressure and amplitude afforded by the pulsed injectors offer a wide range of options for controlling the fuel and air flow rates. Means now known in the art or hereinafter developed for controlling the flow of a liquid or a gas through a passageway are considered within the scope of this invention. One such means comprises the use of a restriction device placed at one or more points within the passageway, its inlet or exit, in order to control volume flow rate and achieve the tuning of the system as described hereinabove.

Tests were conducted using ambient temperature air and diesel fuel in order to demonstrate the $H_2$ yield of an apparatus according to the present invention using: (i) a Mass Flow Controller; and (ii) a pulsed electromagnetic injector. As summarized in the table below, the data showed that an approximately equal $H_2$ yield (98.4%) was achieved at equivalent average O/C Ratios of approximately 1.03.

TABLE 1

| Component Tested | $H_2$ Yield |
|---|---|
| Mass Flow Controller | Base |
| Injectors | 98.4% of Base |

It also has been found that an apparatus in accordance with the present invention provides additional unexpected benefits. Due to the pulsed nature of an injector, the instantaneous O/C Ratio varies with time. Maintaining an equivalent average O/C Ratio while the instantaneous O/C Ratio periodically varies provides resistance to carbon deposition within the reactor (i.e., coking) and therefore improved reactor performance. Varying the frequency and magnitude of these pulses may be used to increase these benefits. For example, periodically varying the O/C Ratio from its normal operation average value to a value X, for a duration d, at period t intervals, while maintaining a constant average output where X can be preferably a value greater than about 10, d can be in the range from about 0.005 seconds to about 1 second, and t can be from about 1 second to about 30 seconds or greater, provides increased resistance to performance degradation compared to steady state constant O/C Ratio operation.

Although the invention has been described in considerable detail, it will be apparent that the invention is capable of numerous modifications and variations, apparent to those skilled in the art, without departing from the spirit and scope of the invention.

The invention claimed is:

1. An apparatus for fuel reforming comprising:
   a) a fuel flow controller for liquid fuel defining an inlet and an exit, wherein the fuel flow controller comprises a pulsed fuel injector;
   b) an air flow controller defining an inlet and an exit, wherein the air flow controller comprises an air injector;
   c) an atomizing mixer defining an inlet and an exit wherein the atomizing mixer is configured to produce under operative conditions a fuel-air mixture having an O/C Ratio;
   d) a passageway for liquid fuel in fluid communication with the exit from the fuel flow controller and said inlet of the atomizing mixer;
   e) a passageway for air in fluid communication with the exit from the air flow controller and said inlet of the atomizing mixer;
   f) a catalytic reforming reactor; and
   g) a passageway for said fuel-air mixture in fluid communication with the exit from the atomizing mixer and with the reforming reactor;
   wherein the atomizing mixer comprises an atomizer that has said inlet of the atomizing mixer; wherein said inlet of the atomizing mixer is in fluid communication with both said passageway for liquid fuel and said passageway for air; and, wherein said atomizer has said exit of the atomizing mixer in fluid communication with said passageway for the fuel-air mixture.

2. The apparatus of claim 1 wherein the fuel flow controller comprises a pulsed electromagnetic fuel injector.

3. The apparatus of claim 1 wherein the air flow controller comprises a pulsed electromagnetic air injector.

4. The apparatus of claim 1 wherein the passageway for liquid fuel of part (d) further comprises a restriction device.

5. The apparatus of claim 1 wherein the passageway for air of part (e) further comprises a restriction device.

6. The apparatus of claim 1 wherein the atomizing mixer has an operative condition that produces a fuel-rich fuel-air mixture.

7. The apparatus of claim 1 wherein the atomizing mixer has an operative condition that produces a fuel-lean fuel-air mixture.

8. The apparatus of claim 1 wherein said air injector comprises a pulsed air injector and wherein the fuel flow controller, the air flow controller, and the atomizing mixer under operative conditions define an average O/C Ratio and an instantaneous O/C Ratio.

9. The apparatus of claim 8 wherein the fuel flow controller, the air flow controller, and the atomizing mixer under operative conditions maintain an average O/C ratio while periodically varying an instantaneous O/C ratio.

10. The apparatus of claim 9 wherein at least one of the fuel flow controller or the air flow controller is capable of varying the frequency of a pulsed flow of reactants therethrough.

11. The apparatus of claim 9 wherein a least one of the fuel flow controller or the air flow controller is capable of varying the magnitude of a pulsed flow of reactants therethrough.

12. The apparatus of claim 9 wherein under at least one operative condition the instantaneous O/C Ratio defines a value greater than about 10, for a duration of less than about 1 second, for period intervals from 1 second to 30 seconds.

13. The apparatus of claim 9 wherein under at least one operative condition the instantaneous O/C Ratio defines a value greater than about 10, for a duration greater than about 1 second, for period intervals greater than about 1 second.

14. An apparatus for fuel reforming comprising:
   a) a fuel flow controller for liquid fuel comprising a pulsed electromagnetic fuel injector and defining an inlet and an exit;
   b) an air flow controller comprising a pulsed electromagnetic air injector and defining an inlet and an exit;

c) an atomizing mixer defining an inlet and an exit wherein the atomizing mixer is configured to produce under operative conditions a fuel-air mixture having an O/C Ratio;

d) a passageway for liquid fuel in fluid communication with the exit from the fuel flow controller and said inlet of the atomizing mixer and wherein said passageway for liquid fuel further comprises a restriction device for controlling under operative conditions the volume of fuel flow therethrough;

e) a passageway for air in fluid communication with the exit from the air flow controller and said passageway for air further comprises a restriction device for controlling under operative conditions the volume of air flow therethrough;

a catalytic reforming reactor; and g) a passageway for said fuel-air mixture in fluid communication with the exit from the atomizing mixer and with the reforming reactor;

wherein the atomizing mixer comprises an atomizer that has said inlet of the atomizing mixer, wherein said inlet of the atomizing mixer is in fluid communication with both said passageway for liquid fuel and said passageway for air and wherein said atomizer has said exit of the atomizing mixer in fluid communication with said passageway for the fuel-air mixture.

* * * * *